United States Patent [19]
Lou et al.

[11] Patent Number: 5,657,325
[45] Date of Patent: Aug. 12, 1997

[54] TRANSMITTER AND METHOD FOR TRANSMITTING INFORMATION PACKETS WITH INCREMENTAL REDUNDANCY

[75] Inventors: Hui Ling Lou, Murray Hill; Vijitha Weerackody, Watchung, both of N.J.

[73] Assignee: Lucent Technologies Inc., Murray Hill, N.J.

[21] Appl. No.: 641,074

[22] Filed: Apr. 26, 1996

Related U.S. Application Data

[63] Continuation-in-part of Ser. No. 414,987, Mar. 31, 1995, which is a continuation-in-part of Ser. No. 415,893, Apr. 3, 1995.

[51] Int. Cl.$^6$ .................................................. H04B 7/12
[52] U.S. Cl. ............................ 370/334; 375/347; 455/63
[58] Field of Search .................................. 370/204, 216, 370/218, 314, 316, 323, 326, 324, 330, 333, 334, 336, 338, 341, 349, 354, 360, 389, 436, 439, 481, 490, 511; 375/265, 267, 278, 280, 284, 315, 332, 334, 335, 337, 341, 346, 347, 348, 349, 358; 455/10, 13.3, 15, 17, 20, 23, 24, 25, 42, 50.1, 52.1, 52.3, 63, 67.3, 67.6, 69, 70, 71, 5.1, 277.2, 274.1, 246, 303, 313; 371/43, 40.2, 37.7, 30, 34, 35, 37.1, 46, 641, 68.1, 41

[56] References Cited

U.S. PATENT DOCUMENTS

5,416,787  5/1995  Kodama et al. .......................... 371/43

*Primary Examiner*—Dang Ton

[57] ABSTRACT

The present invention provides an improved wireless transmitter and method for transmitting incremental redundancy. In one illustrative embodiment of the present invention, switched antenna diversity is used in conjunction with punctured error correction codes to provide an independently fading channel for the punctured bits. In this embodiment, the transmitter includes an error correction encoder which outputs a punctured packet and punctured bits encoded from the information packet. The transmitter further includes a modulator for modulating the punctured packet and punctured bits, a first antenna for transmitting the modulated punctured packet to a receiver, and a second antenna for transmitting one or more of the punctured bits to the receiver, in response to a negative acknowledgment received by the transmitter. The first and second antennas in this embodiment are positioned to provide first and second channels having independent fading characteristics.

11 Claims, 5 Drawing Sheets

TRANSMITTER AND METHOD FOR TRANSMITTING INFORMATION PACKETS WITH INCREMENTAL REDUNDANCY

RELATED APPLICATIONS

This application is a continuation in part of U.S. application Ser. No. 08/414,987, filed Mar. 31, 1995, entitled "SWITCHED ANTENNA DIVERSITY TRANSMISSION METHOD AND SYSTEM." This application is also a continuation in part of U.S. application Ser. No. 08/415,893, filed Apr. 3, 1995, entitled "FAST FADING PACKET DIVERSITY TRANSMISSION METHOD AND SYSTEM." This application is related to U.S. application Ser. No. 08/485,928, filed Jun. 7, 1995, entitled "FAST FADING PACKET DIVERSITY TRANSMISSION METHOD AND SYSTEM," which is a divisional of U.S. application Ser. No. 08/415,893.

FIELD OF THE INVENTION

The present invention relates generally to the field of wireless communications, and particularly to a transmitter and method for transmitting information packets with incremental redundancy in a wireless communication system.

BACKGROUND OF THE INVENTION

In wireless communication systems, error-correction codes are used to introduce redundant bits in the transmitted packets in order to detect and correct errors in the transmitted packet at the receiver. In general, the more redundant bits introduced, the more error protection the code can provide. However, more redundancy implies that a larger transmission bandwidth is required or more delay will be incurred for transmission.

Thus, many wireless communication systems use Automatic Repeat Request (ARQ) schemes in conjunction with punctured error correction codes to transmit the minimal number of coded bits required to send an information packet without error. This is accomplished by removing some of the coded bits before the first transmission, to form a punctured packet for transmission. The removed coded bits are called punctured bits. If the transmitted packet contains errors that cannot be corrected, more punctured bits are transmitted. This may be repeated until an error-free information packet is decoded at the receiver.

There is a problem with transmitters now used in such systems for transmitting the information packets with incremental redundancy. These transmitters transmit the punctured bits over the same noisy channel as the previously transmitted punctured packet. This results in more requests for transmission of further coded bits than might otherwise be necessary, and thus reduced channel throughput.

Thus, there is a need for an improved wireless transmitter and method for transmitting incremental redundancy which does not use the same noisy channel as the previously transmitted punctured information packet.

SUMMARY OF THE INVENTION

The present invention provides an improved wireless transmitter and method for transmitting incremental redundancy which does not use the same noisy channel for the punctured bits as used for the previously transmitted punctured packet, thereby increasing channel throughput, and the overall efficiency of the communication system.

In one illustrative embodiment of the present invention, switched antenna diversity is used in conjunction with punctured error correction codes to provide an independently fading channel for the punctured bits. In this embodiment, the transmitter includes an error correction encoder which outputs a punctured packet and punctured bits encoded from the information packet. The transmitter further includes a modulator for modulating the punctured packet and punctured bits, a first antenna for transmitting the modulated punctured packet to a receiver, and a second antenna for transmitting one or more of the punctured bits to the receiver, in response to a negative acknowledgment received by the transmitter's controller. The first and second antennas in this embodiment are positioned to provide first and second channels having substantially independent fading characteristics. The process may be repeated from all punctured bits using independently fading channels.

In a second illustrative embodiment of the present invention, frequency diversity is used in conjunction with punctured error correction codes to provide an independently fading channel for the punctured bits. In this embodiment, the transmitter transmits the punctured packet to the receiver with one RF frequency and, in response to a negative acknowledgment, sends one or more of the punctured bits with a second RF frequency. In this embodiment, the first and second frequencies are selected to provide first and second channels having substantially independent fading characteristics. The process may be repeated for all of the punctured bits using independently fading channels.

A third illustrative embodiment of the present invention employs sets of fixed phase offsets in conjunction with punctured error connection codes to provide an independently fading channel for the punctured bits. In this embodiment, a first set of fixed phase offsets is applied to the punctured packet, and, in response to a negative acknowledgement from the receiver, a second set of fixed phase offsets is applied to one or more of the punctured bits. The sets of fixed phase offsets are selected to provide a substantially independently fading channel for the punctured bits. This process may be repeated for all of the punctured bits using independent fading channels.

DETAILED DESCRIPTION OF INVENTION

For clarity of explanation, the illustrative embodiments of the present invention are presented as comprising individual functional blocks. The functions these blocks represent may be provided through the use of either shared or dedicated hardware, including, but not limited to hardware capable of executing software. The illustrative embodiments may comprise digital signal processor (DSP) hardware, such as the AT&T DSP16 or DSP32C, and software performing the operations discussed below. Very large scale integration (VLSI) hardware embodiments of the present invention, as well as hybrid DSP/VLSI embodiments, may also be provided.

First Illustrative Embodiment

Figure 1A:
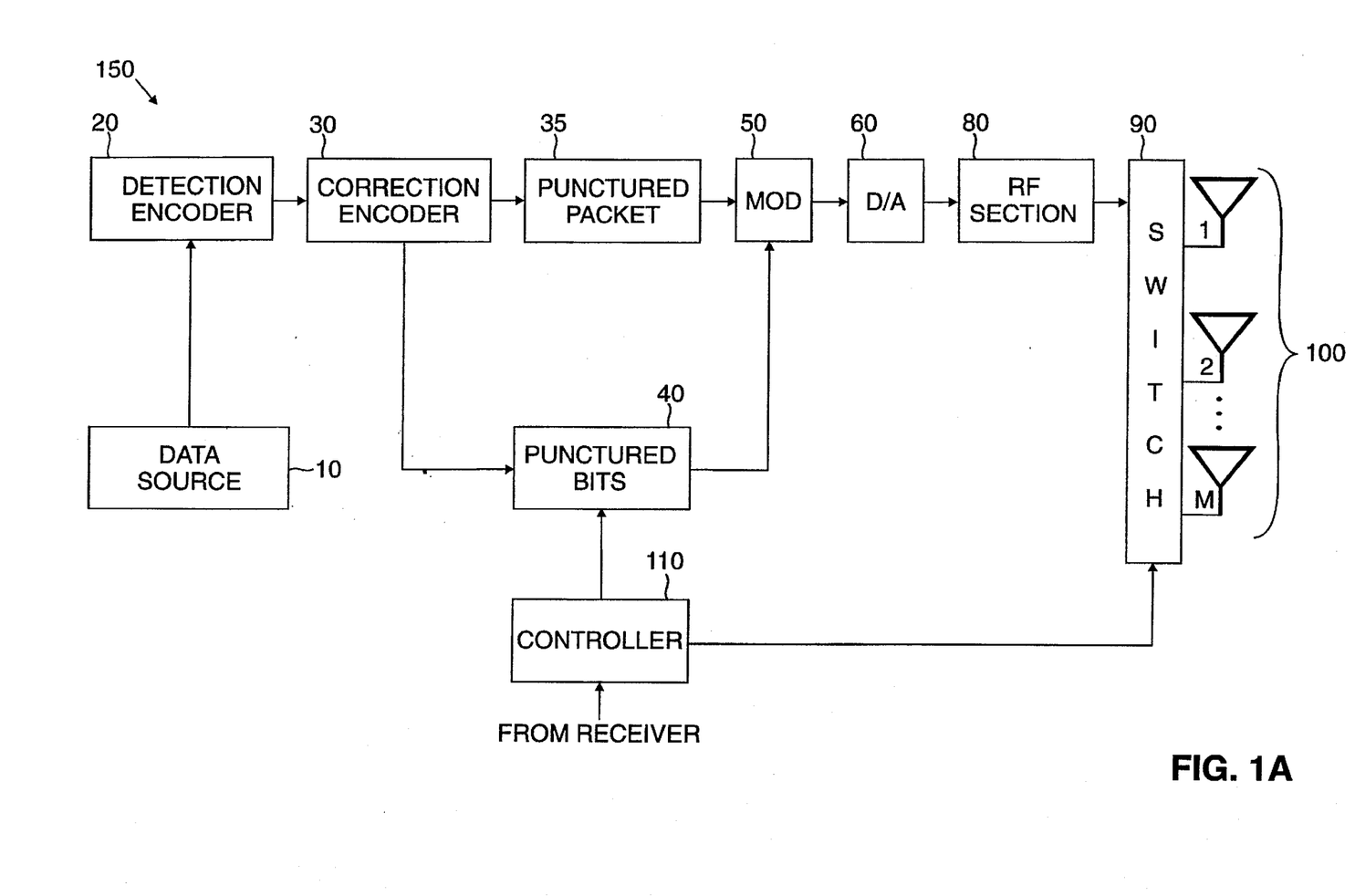
FIG. 1A is a block diagram of a first illustrative embodiment of the present invention.

FIG. 1A shows a block diagram of a first illustrative embodiment of the present invention employing switched antenna diversity in conjunction with punctured convolutional codes. Switched antenna diversity is described in detail in copending U.S. application Ser. No. 08/414,987, entitled "SWITCHED ANTENNA DIVERSITY TRANSMISSION SYSTEM AND METHOD," filed Mar. 31, 1995, which is incorporated by reference herein.

FIG. 1A shows a transmitter 150 for transmitting information packets from a data source 10 with incremental redundancy. The transmitter 150 includes an error detection encoder 20, an error correction encoder 30, a punctured packet memory 35, a memory 40 for the punctured bits, a digital-to-analog modulator 60, a converter 50, an RF section 80, a switch 90, M antennas 100, and a controller 110.

Figure 1B:
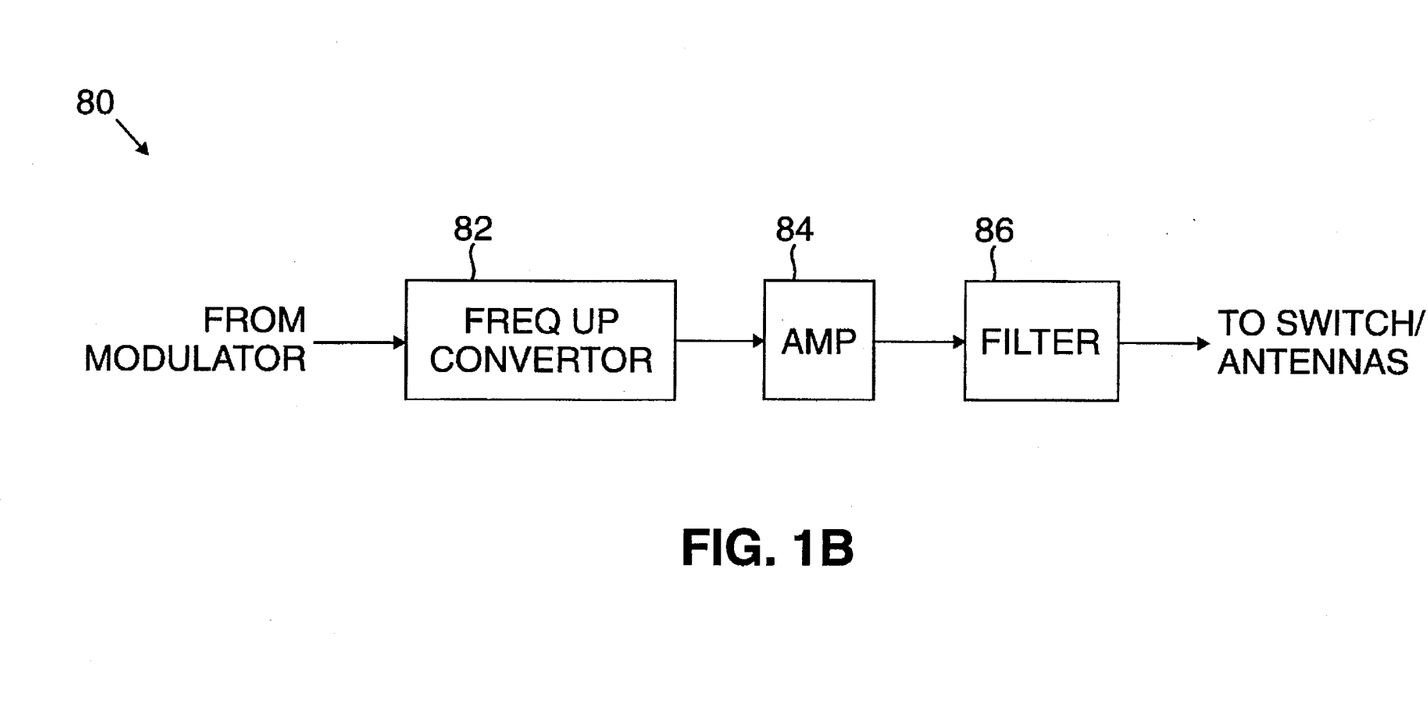
FIG. 1B is a block diagram of an RF section for the wireless transmitter of the first illustrative embodiment.

FIG. 1B shows one example of RF section 80. The RF section includes a frequency up-convertor 82, a low-noise amplifier 84, and a band-pass filter 86.

Under control of controller 110, the transmitter 150 transmits an information packet from data source 10 to an error detection encoder 20 which encodes the information packet with an error detection code. Any suitable error detection encoder may be used, such as, for example, a CRC-16 encoder, which encodes the information packet with a 16-bit cyclic redundancy code. The CRC code is appended to the information packet.

One of ordinary skill in the art will appreciate that the error detection decoder is not necessary where an error can be detected at the receiver by other means, including, for example, where the receiver can declare an erasure using a distance criterion.

The information packet is then forwarded to error correction encoder 30 which encodes the information packet with a suitable error correction code that can be punctured, such as a punctured convolutional code. Generally, convolutional codes are used to protect the transmitted information packet against noise in the communication channel, and enable the receiver to recover the information packet despite errors due to noise. For example, a rate 1/3 convolutional code outputs three coded bits for every information bit in an information packet. That is, two extra redundant bits are added to each information bit for error correction.

With punctured convolutional codes, the error correction encoder 30 removes one or more of the coded bits. The information packet without the removed coded bits is described as a "punctured packet" by those of ordinary skill in the art. The removed bits are described as "punctured bits" by those of ordinary skill in the art.

Removing some of the coded bits decreases the error correcting power of the convolutional code, increases the channel bandwidth required, and potentially can increase the channel throughput. Thus, incremental redundancy provides for a more efficient communication system by using the minimum number of coded bits necessary for the channel conditions at a given time.

If the channel is not noisy the removed coded bits need not be transmitted, effectively permitting more information bits to be transmitted in their place. If, on the other hand, the transmission channel is noisy, and errors in the punctured packet cannot be corrected by the receiver, the receiver in accordance with ARQ protocol, will send a negative acknowledgement. The negative acknowledgement instructs the transmitter to send additional punctured bits to the receiver for use in correcting the error in the information packet. This process of sending punctured bits incrementally may be continued until the information packet can be correctly decoded.

Type II hybrid and Type III ARQ protocols are examples of current ARQ protocols that employ punctured convolutional codes to transmit incremental redundancy. In a Type II system, the punctured bits are not self-decodable and must be combined with the punctured information packet at the receiver to recover the information packet. In a Type III ARQ system the punctured bits are self-decodable. In other words, they can be decoded to recover the information packet. If the receiver is still unable to recover the information packet from the punctured bits, the punctured bits may be combined with the punctured packet to recover the information packet.

Continuing with FIG. 1A, as explained above, the error correction encoder 30 outputs a punctured packet and punctured bits from the information packet. The punctured packet is stored in memory 35 and the punctured bits are stored in memory 40. The controller 110 reads the punctured packet from memory 35 and transfers the packet to modulator 50 which modulates the information packet with a base band signal, for example, 100 KHz. The modulation may be performed in digital or analog. In this example, the modulation is digital and the modulated punctured packet is converted by a digital-to-analog convertor 60 to an analog signal. One suitable modulator is a 4-DPSK modulator. As to the digital-to-analog convertor 60, that may be part of, or separate from, the modulator 50.

The RF section 80 is next in line. As shown in FIG. 1B, the RF section may include, for example, a frequency up-convertor 82, a low noise amplifier 84, and a band-pass filter 86. The frequency up-convertor 82 will convert the frequency of the base band signal representing the modulated packet to a higher frequency RF signal, desired or required for transmission. In wireless telephone applications, that frequency is usually on the order of 900 MHZ.

The low noise amplifier 84 then amplifies the RF signal carrying the modulated punctured packet, to a level suitable for transmission.

The band-pass filter serves to block frequencies other than the desired transmission frequency, to prevent the signal from interfering with other transmissions at those frequencies. As understood by those of skill in the art, the baseband signal may be transmitted without up-conversion of its frequency.

Figure 2:
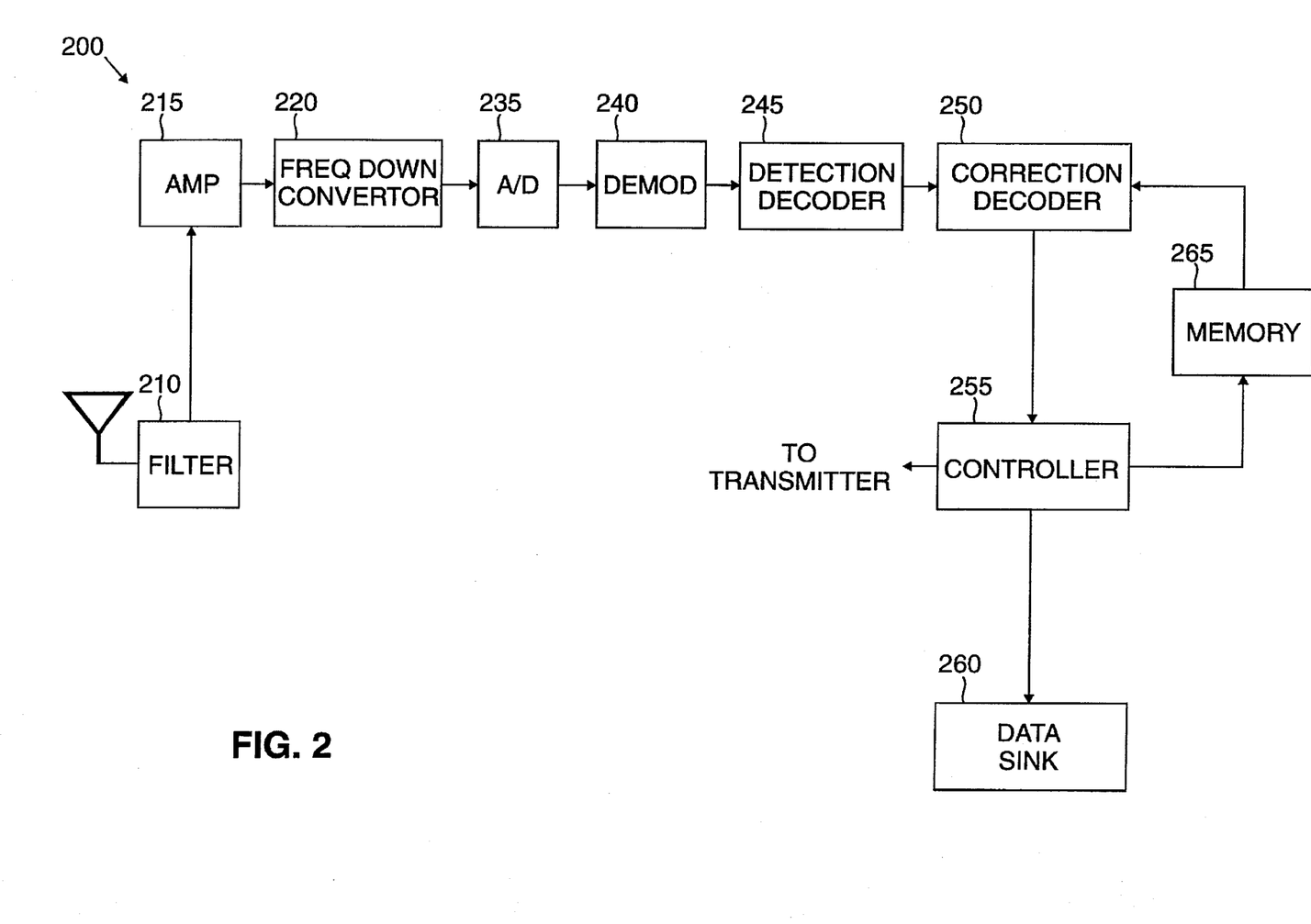
FIG. 2 is a block diagram of an illustrative receiver for use with the communication system of the present invention.

From the RF section, the RF signal representing the modulated punctured packet is transmitted by one of the M antennas 100 to a receiver, such as the illustrative one shown in FIG. 2. The receiver 200 in FIG. 2 includes a bandpass filter 210, a low noise amplifier 215, a frequency down convertor 220, an analog-to-digital convertor 235, a demodulator 240, an error detection decoder 245, an error correction decoder 250, a controller 255, a data sink 260, and a memory 265.

The band-pass filter 210 is tuned to the transmission frequency required to accept the RF signal, and blocks all other signals. The punctured packet once filtered is passed to the low noise amplifier 215 which amplifies the RF signal to a level suitable for further processing. The amplified RF signal is then applied to the frequency down convertor 220, which removes the RF signal leaving the base band signal representing the modulated punctured packet.

The base band signal is sampled by analog-to-digital convertor 235 and demodulated by demodulator 240, although, as will be understood by those of ordinary skill in the art, the base band signal may be demodulated first using an analog demodulator and then converted to digital form.

The error detection encoder 245 or other suitable means of detecting errors, such as, distance criterion which detect erasures, can be used to detect whether errors are present in the punctured packet. If errors are found, error correction decoder 250, complementary with the error correction encoder 30 in FIG. 1, attempts to correct the errors and recover the original information packet from the punctured packet.

If the errors are corrected and the information packet is recovered, the controller 250 transfers the information packet to data sink 260. If the errors cannot be corrected, controller 250 stores the punctured packet in memory 265 and, in accordance with ARQ protocol, sends a request for retransmission of the packet to the transmitter 150 in FIG. 1A. The retransmission request is known as a "negative acknowledgement" by those of ordinary skill in the art.

Returning to FIG. 1A, although not shown, the transmitter 150 has a suitable reception antenna and reception circuitry for receiving the negative acknowledgement. The controller 110 of transmitter 150 responds to the negative acknowledgement by causing switch 90 to select another one of the M antennas for transmission. The controller 110 further responds to the negative acknowledgment by transmitting one or more of the redundant bits to the receiver in the manner described above for the punctured packet.

The M antennas of the present invention are positioned to provide transmission channels having substantially independent fading characteristics. Preferably, the antennas are positioned to provide a correlation coefficient of 0.3 or less. Thus, with switched antenna diversity, the punctured bits are not transmitted over the same noisy channel as the previously transmitted punctured packet.

As explained above, the error correction decoder 250 of receiver 200 will attempt to self-decode the punctured bits and/or combine them with the punctured packet stored in memory 265, in order to recover the information packet. If the information packet is recovered from the error correction decoder 250, the packet will be sent to the data sink 260. But, if the information packet still cannot be recovered, the process of sending punctured bits may be repeated until the information packet is recovered.

Second Illustrative Embodiment

Figure 3:
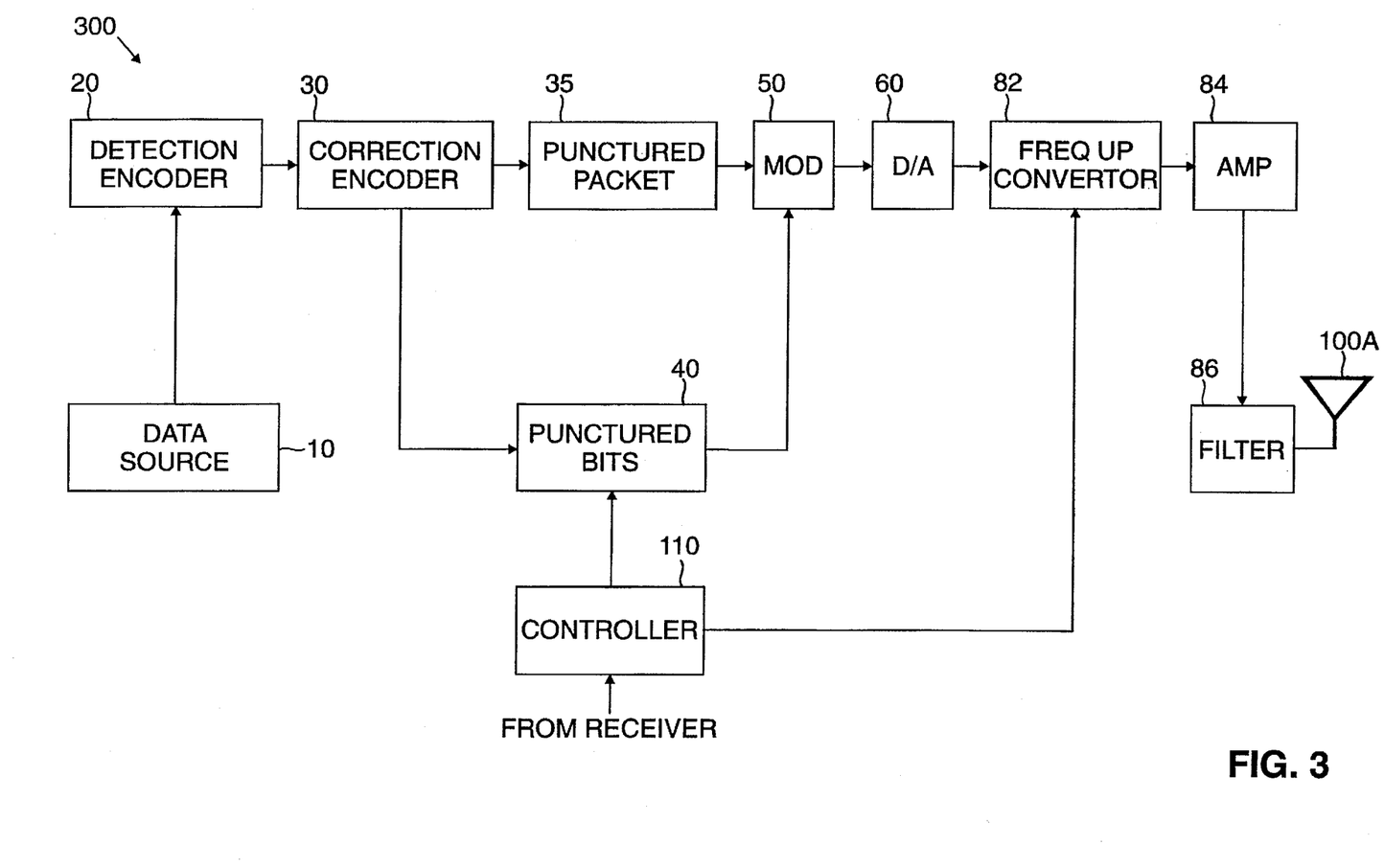
FIG. 3 is a block diagram of a second illustrative embodiment of the present invention.

FIG. 3 shows a second illustrative embodiment of the present invention employing frequency diversity in conjunction with punctured convolutional codes. The components of this embodiment operate in the same manner as described above, with one exception: instead of controller 110 controlling a switch 90 to switch antennas in response to a negative acknowledgement, the controller 110 controls frequency up convertor 82 to change from a first higher frequency, used to transmit the punctured packet, to a second higher frequency, used to transmit the punctured bits.

In applications where less than all of the punctured bits are transmitted in response to a negative acknowledgment, the controller 110 may change the frequency each time a set of one or more of punctured bits are sent to the receiver in response to a negative acknowledgment.

In this illustrative embodiment, the frequency for the punctured bits is selected to provide a channel having substantially independent fading characteristics. Preferably, the frequencies are selected to provide a correlation coefficient of 0.3 or less. Thus, as in the first illustrative embodiment, the punctured bits are not subject to the same noisy channel as the punctured packet.

Third Illustrative Embodiment

Figure 4:
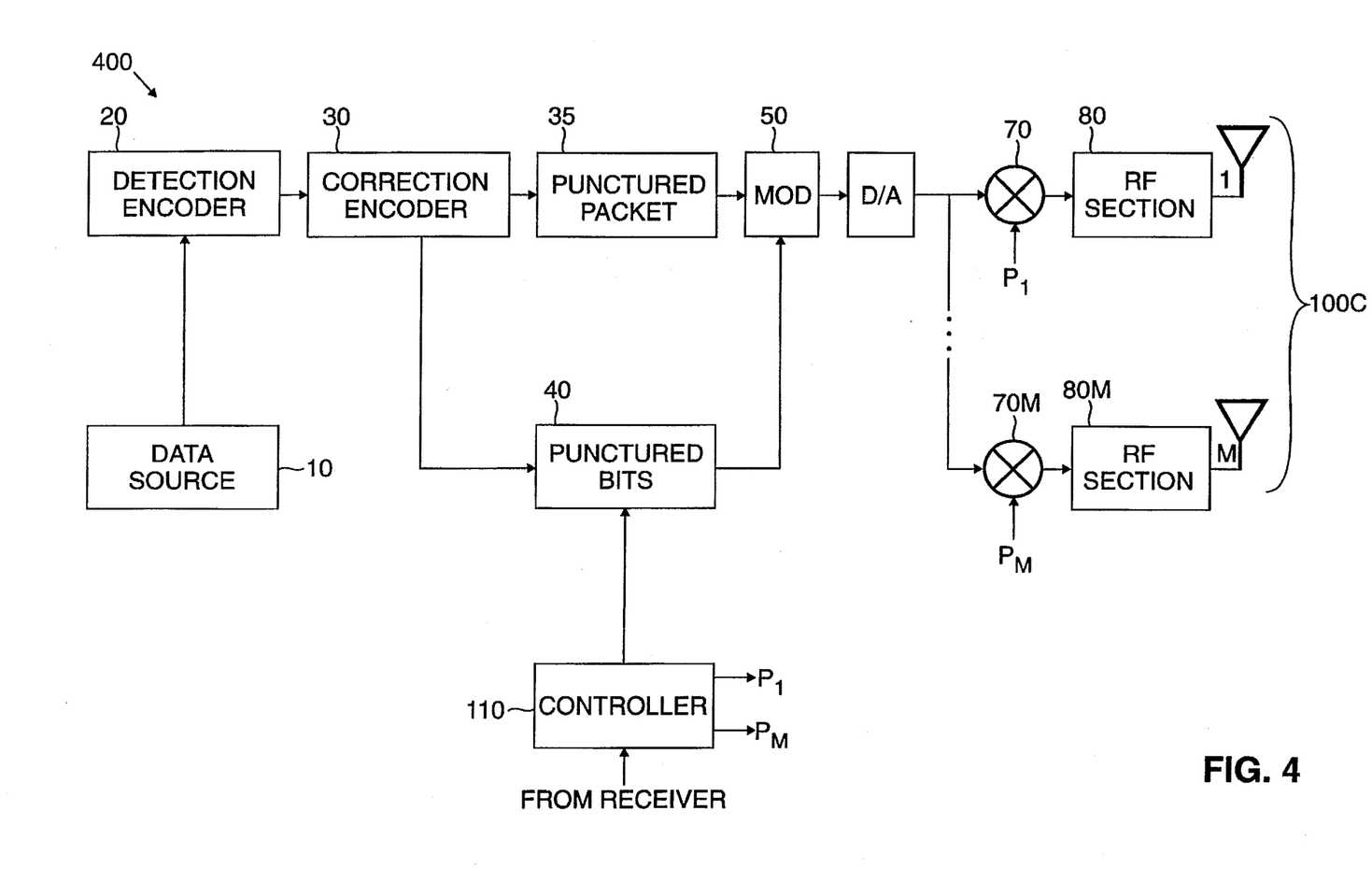
FIG. 4 is a block diagram of a third illustrative embodiment of the present invention.

FIG. 4 shows a third illustrative embodiment of the present invention employing antenna diversity using sets of fixed phase offsets in conjunction with punctured convolutional codes. Antenna diversity using sets of fixed phase offsets is described in detail in U.S. application Ser. No. 08/415,893, entitled "FAST FADING PACKET DIVERSITY TRANSMISSION METHOD AND SYSTEM," filed Apr. 3, 1995, which is incorporated by reference herein.

The components of this embodiment operate in the same manner as the components of the first illustrative embodiment. This embodiment differs from the first by the addition of M multipliers 70, and M RF sections 80, coupled to the M antennas. In this embodiment, M copies of the punctured packet are transmitted simultaneously with a first set of M fixed phase offsets, and, in response to a negative acknowledgment, the punctured bits are transmitted with a second set of M fixed phase offsets.

If less than all of the punctured bits are transmitted, the controller 110 may use another set of the sets of M fixed phase offsets each time additional punctured bits are sent to the receiver in response to a negative acknowledgement.

In this illustrative embodiment, each set of M fixed phase offsets is selected to provide separate channels having substantially independent fading characteristics. Preferably, the sets of phase offsets are selected to provide a correlation coefficient of 0.3 or less. Thus, as in the first and second illustrative embodiments, the punctured bits are not subject to the same noisy channel as the punctured packet.

The M multipliers 70 are used to apply the sets of M fixed phase offsets to the punctured bits and the punctured packet. It will be apparent to one of ordinary skill in the art that one multiplier, which performs the functions of the M multipliers 70, may be used.

The first and the Mth fixed phase offset of each set are represented in FIG. 4 by the notation $P_1$ and $P_M$.

In a preferred embodiment, the M sets of M fixed phase offsets associated with the M antennas 100C may be determined from the following equation:

$$\theta_i(l) = \frac{2\pi}{M} (i-1)(l \bmod M)$$

The letter l corresponds to the set of M fixed phase offsets being used to transmit the modulated information packets; l=1 to M. The letter i corresponds to the fixed phase offset of a set of phase offsets that is being used to transmit the modulated information packets from the ith antenna; i=1 to M. The notation l mod M represents the modulo M value of l. The phase offsets are constant for the duration of the packet.

For the preferred embodiment, the M sets of M fixed phase offsets for a transmission system according to the present invention using three transmission antennas, (M=3) are:

| First Set (l = 1) | Second Set (l = 2) | Third Set (l = 3) |
| --- | --- | --- |
| (i = 1) 0 | 0 | 0 |
| (i = 2) 0 | $\frac{-2\pi}{3}$ | $\frac{-4\pi}{3}$ |
| (i = 3) 0 | $\frac{+2\pi}{3}$ | $\frac{+4\pi}{3}$ |

It will be understood by those of ordinary skill in the art that the M sets of M fixed phase offsets may be determined from other equations and may be applied in a variety of ways to reduce the effects of multipath fading on slow fading channels, depending on the application.

Various changes and modifications of the present invention will be readily apparent to those of ordinary skill in the art, and all such changes and modifications are considered to fall within the scope of the invention as defined by the appended claims.

We claim:

1. A transmitter for transmitting an information packet with incremental redundancy, comprising:
    an error correction encoder for encoding the information packet with an error correction code, said encoder having a first output comprising a punctured packet and a second output comprising punctured bits;
    a modulator for modulating the punctured packet and one or more punctured bits;
    a first antenna for transmitting the modulated punctured packet over a first channel of a communication medium, to a receiver;
    a second antenna for transmitting the modulated punctured bits, over a second channel of the communication medium, to the receiver; wherein said first and second antennas are positioned to provide the first and second channels with substantially independent fading characteristics; and
    a controller for controlling the transmitter to modulate and transmit the punctured packet from the first antenna, over the first channel, to the receiver; and, in response to a negative acknowledgement from the receiver, for further controlling the transmitter to modulate and transmit the one or more punctured bits from the second antenna, over the second channel, to the receiver.

2. The transmitter of claim 1, further comprising an error detection encoder for encoding the information packet with an error detection code.

3. The transmitter of claim 1, wherein said modulator includes a digital-to-analog convertor.

4. The transmitter of claim 1, wherein the first and second antennas each included an RF section, said RF section comprising a frequency up-convertor, a low noise amplifier, and a band-pass filter.

5. A method for transmitting an information packet with incremental redundancy, comprising:
    encoding the information packet with an error correction code;
    forming a punctured packet and punctured bits from the encoded information packet;
    modulating the punctured packet and one or more punctured bits;
    transmitting the modulated punctured packet from a first antenna, over a first channel of a communication medium, to a receiver; and
    transmitting the modulated punctured bits from a second antenna, over a second channel of the communication medium, to the receiver, in response to a negative acknowledgement from the receiver; wherein said first and second antennas are positioned to provide the first and second channels with substantially independent fading characteristics.

6. The method of claim 5, further comprising the step of encoding the information packet with an error detection code.

7. The method of claim 5, wherein the modulated punctured packet and modulated punctured bits each have a frequency, the method further comprising the step of up-converting the frequency to a higher frequency for transmission.

8. A transmitter for transmitting an information packet with incremental redundancy, comprising:
    an error correction encoder for encoding the information packet with an error correction code, said encoder having a first output comprising a punctured packet and a second output comprising punctured bits;
    a modulator for modulating the punctured packet and one or more punctured bits; said modulated punctured packet and modulated punctured bits each having a frequency;
    a frequency up-convertor for converting the frequency of the modulated punctured packet to a first higher frequency, and for converting the frequency of the modulated punctured bits to a second higher frequency; wherein the first and second frequencies are selected to provide first and second channels having substantially independent fading characteristics;
    an antenna for transmitting the modulated punctured packet at the first higher frequency, over the first channel of the communication medium, to a receiver, and for transmitting the modulated punctured bits at the second higher frequency, over the second channel of the communication medium, to the receiver; and
    a controller for controlling the transmitter to modulate and transmit the punctured packet from the antenna at the first frequency, over the first channel of the communication medium, to the receiver; and, in response to a negative acknowledgement from the receiver, for controlling the transmitter to modulate and transmit the one or more punctured bits at the second higher frequency, over the second channel of the communication medium, to the receiver.

9. A method for transmitting an information packet with incremental redundancy, comprising:
    encoding the information packet with an error correction code;
    forming a punctured packet and punctured bits from the encoded information packet;
    modulating the punctured packet and one or more punctured bits, said modulated punctured packet and modulated punctured bits each having a frequency;
    converting the frequency of the modulated punctured packet to a first higher frequency and converting the frequency of the one or more modulated punctured bits to a second higher frequency; wherein the first and second frequencies are selected to provide first and second channels having substantially independent fading characteristics;
    transmitting the modulated punctured packet at the first higher frequency, over the first channel of the communication medium, to a receiver; and
    transmitting the modulated punctured bits at the second higher frequency, over the second channel of the communication medium, to the receiver, in response to a negative acknowledgement from the receiver.

10. A transmitter for transmitting an information packet with incremental redundancy, comprising:
    an error correction encoder for encoding the information packet with an error correction code, said encoder having a first output comprising a punctured packet and a second output comprising punctured bits;
    a modulator for modulating the punctured packet and one or more punctured bits;

a multiplier for applying a first set of M fixed phase offsets to the modulated punctured packet, and a second set of M fixed phase offsets to the modulated punctured bits; said first and second sets of M fixed phase offsets selected to provide first and second channels having substantially independent fading characteristics;

M antennas for transmitting the modulated punctured packet over the first channel of a communication medium, with the first set of M fixed phase offsets, to a receiver; and, for transmitting the modulated punctured bits over the second channel of the communication medium, with the second set of M fixed phase offsets, to the receiver; and a controller for controlling the transmitter to modulate and transmit the punctured packet with the first set of M fixed phase offsets from the M antennas, over the first channel, to the receiver; and, in response to a negative acknowledgment from the receiver, for further controlling the transmitter to modulate and transmit the one or more punctured bits with the second set of M fixed phase offsets from the M antennas, over the second channel, to the receiver.

11. A method for transmitting an information packet with incremental redundancy, comprising:

encoding the information packet with an error correction code;

forming a punctured packet and punctured bits from the encoded information packet;

modulating the punctured packet and one or more punctured bits;

applying a first set of M fixed phase offsets to the modulated punctured packet, and a second set of M fixed phase offsets to the modulated punctured bits; said first and second sets of M fixed phase offsets selected to provide first and second channels having substantially independent fading characteristics;

transmitting the modulated punctured packet over the first channel of a communication medium, from M antennas, with the first set of M fixed phase offsets, to a receiver; and transmitting the modulated punctured bits over the second channel of the communication medium, from the M antennas, with the second set of M fixed phase offsets, to the receiver, in response to a negative acknowledgement from the receiver.

* * * * *